United States Patent Office 3,392,104
Patented July 9, 1968

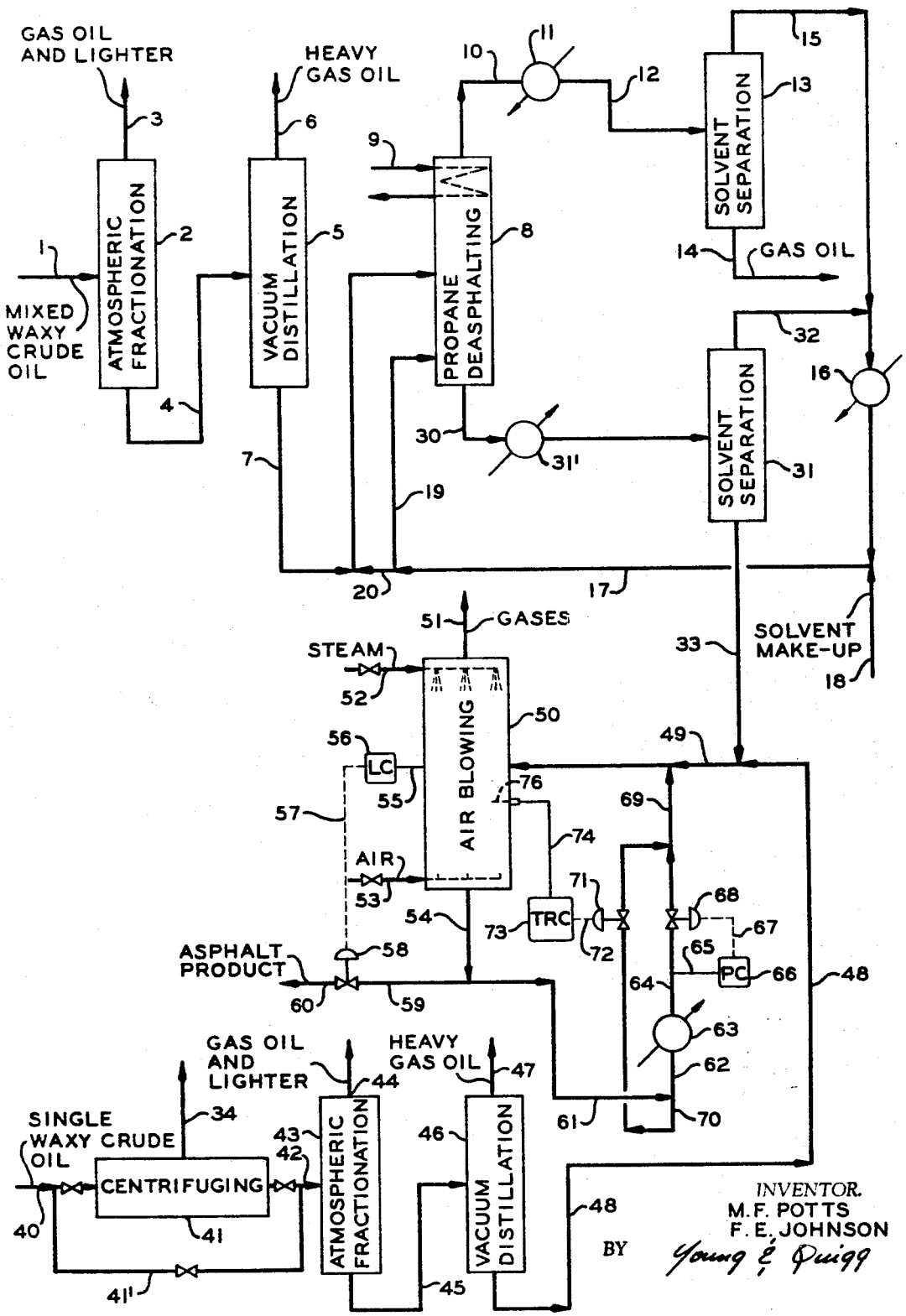

3,392,104
PRODUCTION OF NEGATIVE OLIENSIS ASPHALT BY OXIDIZING A BLEND OF OLIENSIS POSITIVE AND OLIENSIS NEGATIVE ASPHALTS
Mack F. Potts and Frank E. Johnson, Bartlesville, Okla., assignors to Phillips Petroleum Company, a corporation of Delaware
Filed Aug. 24, 1964, Ser. No. 391,428
6 Claims. (Cl. 208—6)

This invention relates to a method and apparatus for producing asphalt.

Heretofore problem crude oils or residuum therefrom having the general characteristics of containing from 1 to 8 weight percent wax content and having a gravity of from 20 to 50° A.P.I. at 60° F. have been treated by distillation and/or propane deasphalting in an effort to make specification-meeting asphalt products. However, the products actually obtained did not meet specification requirements on penetration and ring and ball tests or had an undesirable positive Oliensis spot test or both. Also, heretofore in certain cases where the Oliensis test was the desired negative the penetration and ring and ball characteristics were improved by air blowing, but the negative Oliensis test characteristics were destroyed and the end product displayed an undesirable positive Oliensis spot test.

Accordingly, it is an object of this invention to provide a method and apparatus whereby problem crude oil or residuum therefrom can be made to yield an asphalt product that meets specification requirements. It is another object of this invention to provide a method and apparatus whereby one or more problem crude oils or residuum therefrom are separately treated and rendered capable of producing a specification-meeting asphalt.

Other aspects, objects and advantages of the invention will be apparent to those skilled in the art from the description, the drawing and the appended claims.

It has now been found that if two crude oils having the general characteristics of from 1 to 8 weight percent wax content and a gravity of from 20 to 50° A.P.I. at 60° F. are each treated so that one of the crude oils produces a first asphaltic product having a specific gravity, 60/60° F., greater than 1, an ASTM D-5-52 (77° F., 100 gm. and 5 seconds) penetration characteristic from 0 to 50, and an ASTM D-36-26 ring and ball softening point of at least 200° F. and the other crude oil produces a second asphalt product having a specific gravity, 60/60° F., of less than 1, an ASTM D-5-52 (77° F., 100 gm. and 5 seconds) penetration characteristic of at least 200, an ASTM D-36-26 ring and ball softening point of less than 100° F., and a negative Oliensis spot test, these two asphaltic products can be mixed and oxidized by known methods to produce a specification-meeting asphalt product.

Specification requirements as to asphalt products can vary over a large range of values; but generally the asphalt product of this invention will have a specific gravity, 60/60° F., of about 1, an ASTM D-5-52 (77° F., 100 gm. and 5 seconds) penetration characteristic of from 70 to 110, an ASTM D-36-26 ring and ball softening point of from 90 to 130° F. and a negative Oliensis spot test.

It is important to note that the Oliensis spot test of the first asphaltic product is immaterial. That is, the spot test can be the undesirable positive but the final asphalt product produced by mixing and oxidizing the first and second asphaltic products of the two crude oils will still meet specification requirements of a negative Oliensis spot test.

Specific crudes of the type employed in this invention are Rangely (Colorado-Wyoming) field crude which has a gravity of from 34 to 36° A.P.I. at 60° F. and a wax content of from 3 to 4 weight percent, Uinta (Utah-Wyoming) field crude which has a gravity of from 28 to 30° A.P.I. at 60° F. and a wax content of from 5 to 6 weight percent, and Patrick Draw (Wyoming) field crude which has a gravity of from 43 to 44° A.P.I. at 60° F. and a wax content of up to 1 weight percent. The crude oils mentioned above are merely examples of those which are suitable for treatment according to this invention.

The mixing operation of the two asphaltic products can be carried out in any volume percentages which will, due to the particular idiosyncrasies of the materials involved, ultimately yield the desired specification-meeting asphalt product. However, the above-described first asphaltic product can be present in the mixture in the range of from about 50 to about 70 volume percent and the second asphaltic product can be present in the range of from 30 to 50 volume percent.

Generally, when the asphaltic product of a blend of crude oils of, for example, Uinta, Patrick Draw, and Rangely field crudes is mixed with the asphaltic product of a single crude oil, for example, Rangely, the volume percentage of the mixture would be in the range of from about 50 to about 70 volume percent of the asphaltic product of the crude oil blend and from about 30 to about 50 volume percent of the asphaltic product of the single crude oil. Preferably, the mixture will be about 60 volume percent of the asphaltic product of the blend and about 40 volume percent of the asphaltic product of the single crude. The single crude preferably will have a gravity of from 34 to 36° A.P.I. at 60° F. and a wax content of from 3 to 4 weight percent, preferably about 35° A.P.I. at 60° F. and a wax content of about 3 weight percent. The crude oil blend will contain, for example, from 30 to 40, preferably about 36.6, volume percent Patrick Draw, from 20 to 25, preferably about 22.2, volume percent Uinta and from 35 to 50, preferably about 41.2, volume percent Rangely and will have a gravity of from 32 to 40° A.P.I. at 60° F. and a wax content from 1 to 4 weight percent, preferably about 36° A.P.I. at 60° F. and a wax content of about 2.3 weight percent.

In the drawing, the figure is a flow sheet embodying the invention.

More specifically, a problem crude oil or blend of problem crude oils passes by 1 to an atmospheric fractionation zone 2. A light fraction such as gas, gasoline, kerosene, gas oil, and the like is removed from 2 by line 3 and the heavier asphalt-containing topped crude fraction is removed from 2 by 4 and passed to vacuum distillation zone 5. In vacuum distillation zone 5, constituents, such as heavy or vacuum gas oil, are removed by line 6 and a more concentrated asphalt-containing fraction (vacuum reduced crude) is removed by line 7 and passed to a solvent deasphalting or extraction zone 8.

There is provided in the top of zone 8 a heater 9. Solvent liquid passes into zone 8 directly by means of a valved line 19 and/or indirectly by mixing with the vacuum reduced crude material in line 7 by means of a valved line 20. An asphalt product is removed from zone 8 by 30 and heater 31' and is passed to a solvent separator 31 in which solvent is separated and passed by 32 to 15 to be condensed by condenser 16 and passed by 17 for further utilization in zone 8.

The thus treated asphalt then passes from zone 31 by 33 to be mixed with an asphalt recovered from a separately treated crude. Solvent soluble materials, including those which originally made the mixed crude a problem crude, i.e., wax and waxy constituents, pass from zone 8 by 10 through heater 11 and on through 12 to solvent separation zone 13. Desirable fractions such as gas oil pass from zone 13 by 14 for further treatment, storage, etc. Separated solvent passes from zone 13 by 15 to be mixed with solvent from line 32 and then be passed to condenser 16. From condenser 16 the solvent passes by 17 to zone 8 by way of line 19 or 20 or both. Make-up liquid solvent is added by 18 to line 17.

A separate problem crude passes by 40 to a centrifuge 41 (in this example) wherein problem materials are, to some extent, removed by line 34. For example, Rangely crude generally should be centrifuged to remove wax therefrom in order to prevent the Oliensis spot test of the produced asphalt or cut backs from being positive while other crudes do not need to be centrifuged but rather require other and quite different treatment such as solvent extraction. However, according to this invention two separate crude oils or mixtures of crude oils are treated in a manner such that they complement one another and when combined produce a highly desirable product. A centrifuge by-pass line is indicated at 41' for use if a centrifuge is not needed.

The thus purified crude then passes by 42 to an atmospheric fractionation zone 43 in which lighter constituents such as gas, gasoline, kerosene, gas oil, etc., are removed by 44 and from which an asphalt-containing topped crude fraction is removed by 45 and passed to vacuum distillation zone 46. Constituents, such as heavy gas oil, are removed from zone 46 by line 47 and a concentrated asphalt (vacuum reduced crude) fraction is removed from zone 46 by 48 and mixed with the asphalt fraction passing through line 33. The special mixture or blend of asphalts thus produced passes by 49 to oxidizing zone 50.

In oxidizer 50 the special blend is treated with air and steam, if desired, in order to partially oxidize and polymerize said blend and cause same to meet specification requirements. Air is introduced into the oxidizer by 53 and steam is introduced by 52. Air, steam, and other gases created by the reaction of the blend with the air and steam leave oxidizer 50 by line 51. The thus treated asphalt which now meets specification requirements passes from oxidizer 50 by 54. Product asphalt is removed via lines 59 and 60 to storage or further treatment as desired.

The flow of product into line 60 is controlled by valve 58 which valve is, in turn, controlled by level controller 56 operatively connected to said valve by line 57 and to the air blowing zone 50 by line 55. At least part of the asphalt passes through line 61 and is thereby ultimately returned to oxidizer 50. At least part of the asphalt in line 61 passes by 62 to a heater 63 and from there by 64 to line 69. The flow of material in line 64 is controlled by pressure controller 66 which is operatively connected by 65 to line 64 and also operatively connected by line 67 to valve 68, to maintain a preselected pressure downstream of heater 63. Depending upon the temperature requirements in oxidizer 50, varying amounts of air-blown asphalt are passed through line 70 and valve 71 to line 69 thereby by-passing heater 63. The amount of material passing through valve 71 is controlled by the temperature in oxidizer 50. Temperature sensing means 75 senses the temperature in oxidizer 50 and transmits a signal by 74 to temperature controller 73 which is operatively connected by 72 to valve 71. Thus, if the temperature in oxidizer 50 exceeds a predetermined maximum value, valve 71 will be opened thereby allowing a greater amount of cooler material, as compared to that material in line 64, to pass into line 69. Material passing into line 69 ultimately reaches oxidizer 50 through line 49.

Generally, any known process for treating an asphalt product to make same meet specification is utilizable on the asphalt products of this invention. Air blowing the special asphalt and mixtures thereof produced will yield the desired result.

It should be noted that although the processes for treating the separate crudes are generally of a continuous nature, the oxidizing operation can readily be made either continuous or of the batch type process. If the oxidizing process is to be the batch type, it is desirable to insert into line 49 a storing zone adapted to continuously receive the asphalt blend and to pass said blend through the oxidizing operation intermittently as required. It should also be noted that when a storage zone is provided the separate crude treating operations can also be run on an intermittent basis, using only one atmospheric fractionation zone and only one vacuum distillation zone. The blend of crudes could be run 85 percent of the time and the single crude could be run for only 15 percent of the time. The solvent deasphalting zone could be run on the blend of crudes continuously if storage were provided for the vacuum reduced crude produced from that blend.

SPECIFIC EXAMPLE.—TABLE I

| | Conduit as on Drawing | | | | | | | | | |
|---|---|---|---|---|---|---|---|---|---|---|
| | (1) | (4) | (7) | (33) | (40) | (45) | (48) | (49) | (60) | (53) | (52) |
| | Mixed Waxy Crude Oil | Topped Crude | Vacuum Reduced Crude | Asphalt Base (mixed) | Single Waxy Crude Oil | Topped Crude | Vacuum Reduced Crude | Asphalt Base Blend | Asphalt Product | Air | 150 p.s.i. Steam |
| Volume, barrels/day | 16,400 | 4,592 | 3,280 | 566 | [1] 1,520 | 486 | 380 | 946 | [2] 935 | | |
| API at 60° F | 36.0 | | 15.3 | 5.8 | 35.0 | | 16.0 | | | | |
| Specific Gravity, 60/60° F | | | | 1.013 | | | 0.96 | | 1.006 | | |
| Penetration, 77° F., 100 gm., 5 sec | | | | 0 | | | 200+ | | 81 | | |
| Ductility, 77° F., 5 cm./sec | | | | | | | | | 110+ | | |
| Ring & Ball S.P., ° F | | | | 200+ | | | <100 | | 115 | | |
| Oliensis Spot Test | | | | [3] | | | [4] | | [4] | | |
| Std. cu. ft./min | | | | | | | | | | 250 | |
| Pounds/hour | | | | | | | | | | | 510 |

NOTE.—40 is Rangely crude oil, 100%, 1 is mixed crude:
  (a) Uinta Field crude _____ 22.2
  (b) Patrick Draw crude _____ 36.6
  (c) Rangely crude _____ 41.2
                                          100.0

[1] Contains 5% by weight waxy material removed via 34.
[2] On continuous flow basis, no intermediate storage.
[3] Positive.
[4] Negative.

TABLE II
[Unit Operations]

| | Vessel Number as on Drawing | | | | |
|---|---|---|---|---|---|
| | (41) | (2) & (43) | (5) & (46) | (8) | (50) |
| | Centrifuge Zone | Atmospheric Fractionation | Vacuum Distillation | Propane Deasphalting | Air Blowing |
| Pressure | 600 g | Atmospheric | 2mm. Hg* | 400 p.s.i.g | 5 p.s.i.g. |
| Temperature, ° F | 80 | Bottom, 700 | 710 | Top, 130; Bottom 110. | 450. |

*2 mm. Hg Absolute.

The asphalt products of this invention are, due to this invention, marketable in that they can, by suitable known processes, be made to meet and even exceed specification requirements set forth by industry and/or government agencies concerning such tests as ring and ball softening point, penetration, ductility (ASTN tests) and Oliensis spot test. As regards waxy crude oils, asphalts produced therefrom by ordinary known processes generally will not meet specification requirements for the ductility and Oliensis spot tests. However, by the application of this invention to such problem crudes, ductility is greatly increased and the Oliensis spot test is converted from the undesirable positive to the desirable negative. Details of the Oliensis spot test can be found in the Encyclopedia of Chemical Technology, Kirk-Othmer, volume 2, page 175. The asphalt products of this invention are useful not only as asphalt cements but also can be used in cut backs for road and highway surfacing and the like.

By the use of the term "crude" herein it is meant to include any suitable asphalt source including crude oil, residuum, topped crude and similar materials.

Reasonable variations and modifications of this invention can be made, or followed, in view of the foregoing, without departing from the spirit or the scope thereof.

We claim:

1. A method of producing specification asphalt comprising providing at least two crude oils having the general characteristics of from 1 to 8 weight percent wax content and a gravity of from 20 to 50° A.P.I. at 60° F., separately treating at least one of said crude oils to produce a first asphalic product having a specific gravity, 60/60° F., greater than 1, an ASTM D–5–52 penetration characteristic of from 0 to 50 and an ASTM D–36–26 ring and ball softening point of at least 200° F. and a positive Oliensis spot test separately treating at least one of said crude oils to produce a second asphaltic product having a specific gravity, 60/60° F., of less than 1, an ASTM D–5–52 penetration characteristic of at least 200, an ASTM D–36–26 ring and ball softening point of less than 100° F. and a negative Oliensis spot test, combining said first and second asphaltic products using at least 50 volume percent of said first asphaltic product and oxidizing same to produce an asphalt product that meets specification requirements of a specific gravity, 60/60° F., of about 1, an ASTM D–5–52 penetration characteristic of from 70 to 110, an ASTM D–36–26 ring and ball softening point of from 90 to 130° F. and a negative Oliensis spot test.

2. The method of claim 1 wherein said first asphaltic product is produced by at least one distillation operation followed by a propane deasphalting operation, wherein said second asphaltic product is produced by at least one distillation operation.

3. The method of claim 1 wherein said first asphaltic product is present in the combination of first and second asphaltic products in the range of from 50 to 70 volume percent, the balance of said combination being said second asphaltic product.

4. A method of producing specification asphalt comprising providing a single crude oil having a gravity of from 34 to 36° A.P.I. at 60° F. and a wax content of from 3 to 4 weight percent, providing a blend of crude oils having from 30 to 40 volume percent of a crude oil which has a gravity of from 43 to 44° A.P.I. at 60° F. and a wax content of up to 1 weight percent, from 20 to 25 volume percent of a crude oil having a gravity of from 28 to 30° A.P.I. at 60° F. and a wax content of from 5 to 6 weight percent, and from 35 to 50 volume percent of a crude oil having a gravity of from 34 to 36° A.P.I. at 60° F. and a wax content of from 3 to 4 weight percent, separately treating said single crude oil to produce a first asphaltic product having a specific gravity, 60/60° F., of less than 1, an ASTM D–5–52 penetration characteristic of at least 200, an ASTM D–36–26 ring and ball softening point of less than 100° F. and a negative Oliensis spot test, separately treating said crude oil blend to produce a second asphaltic product having a specific gravity, 60/60° F., greater than 1, an ASTM D–5–52 penetration characteristic of from 0 to 50 and an ASTM D–36–26 ring and ball softening point of at least 200° F., and a positive Oliensis spot test, combining said first and second asphaltic products using at least 50 volume percent of said second asphaltic product and oxidizing same to produce an asphalt product that meets specification requirements of a specific gravity, 60/60° F., of about 1, an ASTM D–5–52 penetration characteristic of from 70 to 110, an ASTM D–36–26 ring and ball softening point of from 90 to 130° F. and a negative Oliensis spot test.

5. The method of claim 4 wherein said first asphaltic product is present in the combination of first and second asphaltic products in the range of from about 30 to 50 volume percent, the balance of said combination being said second asphaltic product.

6. The method of claim 5 wherein said first mentioned single crude oil has a gravity of about 35° A.P.I. at 60° F. and a wax content of about 3 weight percent and the crude oil blend has a gravity of about 36° A.P.I. at 60° F. and a wax content of about 2.3 weight percent.

References Cited

UNITED STATES PATENTS

| | | | |
|---|---|---|---|
| 1,889,697 | 11/1932 | Pullar | 208—4 |
| 2,099,434 | 11/1937 | Culbertson | 208—4 |
| 2,144,694 | 11/1939 | Smith et al. | 208—6 |
| 2,861,939 | 11/1958 | Biribaur et al. | 208—6 |
| 3,003,945 | 10/1961 | Little | 208—4 |

FOREIGN PATENTS 241,342　11/1962　Australia.

OTHER REFERENCES

Asphalt—Its Composition and Properties, Ralph N. Traxler.

The Chemical Constituents of Petroleum, by A. N. Sachanen, Rheinhold Publ. Corp., New York, 1945, p. 286.

DANIEL E. WYMAN, *Primary Examiner.*

P. E. KONOPKA, *Assistant Examiner.*